Feb. 8, 1966   P. G. KESSEL ETAL   3,233,306
TOOL FOR CUTTING THERMOPLASTIC FILM
Filed March 19, 1965

INVENTORS.
Philip G. Kessel
Kenneth J. Cleereman
BY
AGENT

United States Patent Office 3,233,306
Patented Feb. 8, 1966

3,233,306
TOOL FOR CUTTING THERMOPLASTIC FILM
Philip G. Kessel, Madison, Wis., and Kenneth J. Cleereman, Midland, Mich., assignors to The Dow Chemical Company, Midland, Mich., a corporation of Delaware
Filed Mar. 19, 1965, Ser. No. 441,273
2 Claims. (Cl. 29—95)

This application is a continuation-in-part of our copending application Serial No. 295,676, filed July 17, 1963, which was a continuation-in-part application of application Serial No. 838,487, filed September 8, 1959, now abandoned.

This invention relates to a tool for slitting thermoplastic film. More particularly, it relates to tool for slitting thermoplastic film without unwinding it from the ordinary wound or rolled supply package in which it is obtained.

It is conventional practice in the manufacture of thermoplastic film to produce a relatively wide membrane by either sheet extrusion or bubble extrusion. This wide sheet may oftentimes be subsequently slit to a desired width, since it is generally more advantageous to initially and directly produce wide sheet and later cut or slit it into suitable more narrow widths, as may be desired or required. After extrusion, the wide uncut film is generally wound into large rolls containing up to 10,000 or more feet in length. Such rolls are then taken to a slitting machine, where they are unwound and the single sheet or film is passed over stationary or rotary knives. Thus, in practice of the conventional technique, the sheet is cut to a desired width by slitting only a single thickness at a time. The slit film is then rewound to give a roll of the desired dimensions.

Conventional single-thickness slitting is an extremely time-consuming operation. It requires an appreciable investment in equipment and generally involves the continuous attention of at least one person while the machine is in operation. Elaborate speed controls and tensioning devices are employed in order to maintain a constant slitting speed and to prevent breakage of the film during the operation. The maximum speed generally attained with conventional slitting machines is about 300 to 400 feet per minute when slitting thermoplastic film. Breakage during the slitting operation is a serious and wasteful inconvenience. Many users of thermoplastic film require long continue sheets without the discontinuities arising from breakage in the roll.

Many attempts have been made to slit or cut rolls of thermoplastic film without unwinding, such as sawing or cutting with various forms of knives, shears and the like. Such attempts have been notably unsuccessful, as the heat and pressure generated in this cutting operation frequently fractures and usually fuses together the adjacent freshly prepared edges of the film roll. This, as is apparent, results in a roll that cannot be unwound without either destroying the film or seriously weakening its edges.

It would be advantageous to have available a tool for cutting relatively wide rolls of thermoplastic film to desired narrower widths without fusing together of the freshly prepared edges.

It would be advantageous if such a tool could operate at high rates of speed.

It would be most advantageous if such a tool were able to slit film at rates of about 2,000–5,000 feet per minute; produce a minimum of scrap material; and operate in such a manner that no breakage of the film would occur.

It would also be advantageous if such a tool could operate without fracturing the edges of the film being slit.

These and other advantageous results and benefits may be achieved with a tool in accordance with the present invention.

The present tool comprises in cooperative combination two spaced cutting bits rigidly mounted on a shank, the bits having cutting edges, the cutting edges being defined by a first surface and a second surface, the first surfaces forming a side clearance angle of from about ½° to about 30° with a longitudinal axis of the shank, the second surfaces of the bits being symmetrically disposed on either side of the feed axis of the bit and forming an included angle of less than about 70° the cutting edges in angular relationship to a plane normal to the longitudinal axis of the shank, each of said bits terminating in a work engaging point remotely disposed from said shank, the second surfaces of the bits and the tool shank defining a substantially unobstructed space therebetween whereby the points of the bits may engage a solid planar surface simultaneously.

Further features and advantages of the invention will be more apparent in the following description and specification when taken in connection with the accompanying drawing, wherein.

Figure 3:
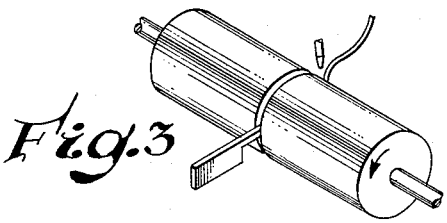
Figure 5:
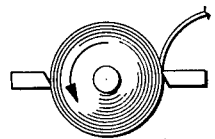
Figure 4:
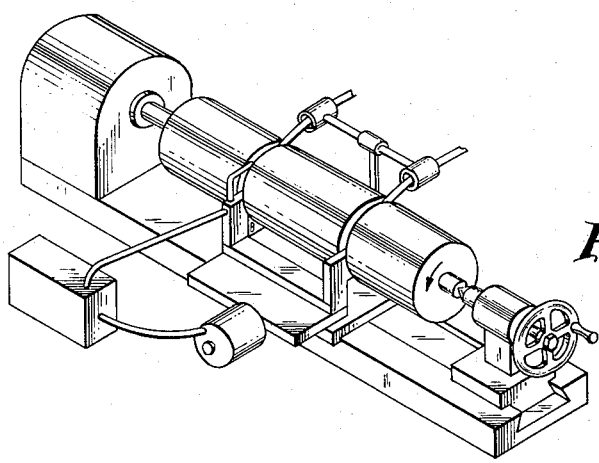
Figure 4A:
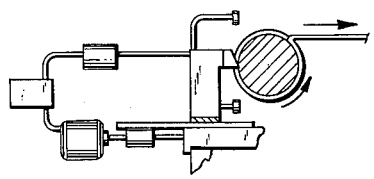

FIGURE 3 schematically illustrates a roll of film being slit with the tool of the present invention;

FIGURE 4 is a perspective representation of an automatically controlled film slitting apparatus employing a tool in accordance with the invention;

FIGURE 4A is a detailed schematic representation of the operation of the tool feeding and control mechanism;

FIGURE 5 illustrates an alternate arrangement of cutting tool; and

Figure 6:
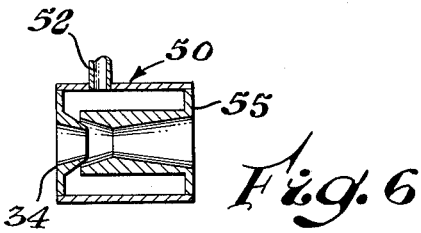

FIGURE 6 shows a cross-sectional view of a venturi tube adapted to remove a ribbon of film cut by the tool of the invention.

Figure 1:
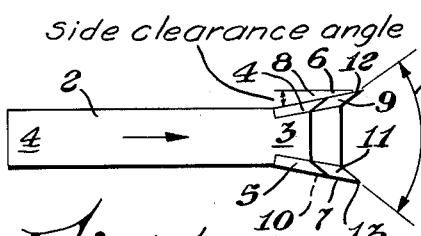
FIGURE 1 illustrates a bottom view of a cutting tool in accordance with the invention.
Figure 2:
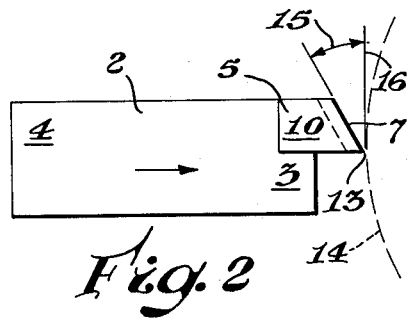
FIGURE 2 illustrates a side view of the cutting tool illustrated in FIGURE 1.

In FIGURES 1 and 2 there is illustrated a top and side view of a cutting tool generally indicated by the reference numeral 1. The tool 1 comprises a shank 2 having a longitudinal axis generally indicated by the arrow. The shank 2 has a first end 3 and a second end 4. Affixed to the first end 3 is a pair of cutting bits 4 and 5. The cutting bits 4 and 5 have cutting edges 6 and 7, respectively. The cutting edge 6 is defined by a first or outer surface 8 and an inner surface 9. The cutting edge 7 is defined by a first or outer surface 10 and a second or inner surface 11. The surfaces 8 and 10 form a side clearance angle of from one-half to 30° with reference to the longitudinal axis of the body 2. The inner surfaces 9 and 11 diverge away from the longitudinal axis of the body 2 and from an included angle of less than 70°. The surfaces 9, 11 and the terminal portion of the first end 3 of the body 2 define a space. The cutting bits 4 and 5 terminate in points 12 and 13 remote from the body 2 and the edges 6 and 7 of the bits 4 and 5 slope toward the body 2. In FIGURE 2 an arcuate dotted line 14 indicates the position of the workpiece in engagement with the tool and the cutting edge 7 from an acute angle 15 with a tangent 16 to the arcuate dotted line 14.

In FIGURE 3, there is illustrated a cutter, indicated generally by the numeral 102, in operative engagement with a roll of films, indicated generally by the reference numeral 20, carried on the mandrel 21. As the roll 20 is rotated and the cutter 102 is moved to circumferentially engage it, a strip of film, indicated by the reference numeral 22, is thereby removed therefrom so as to leave the freshly cut film edges 23. An air stream (not shown) is provided through the air nozzle 25. This serves to pneumatically remove the cut film from the valley, indicated generally by the numeral 26, which is formed by the removal of the strip or ribbon 22. In this way, the ribbon 22 may convenienty be prevented from fouling the cutter 102.

In operation, the roll 20, supported on the mandrel 21, is rapidly rotated at speeds up to about 2,000 revolutions per minute. The tool 102 is then brought into engagement with the surface of the roll 20. Preferably, a feed rate of the tool 102 should be maintained which will be approximately equal to a thickness of the film per revolution of the roll 20. Thus, with each revolution of the roll 20, at least a single layer of film is cut therefrom. The cut ribbon 22 is then removed by means of the air blast from the nozzle 25.

In FIGURE 4, there is schematically illustrated a perspective view of an alternate embodiment of the invention, wherein the roll 20 having valleys 26 is supported on the mandrel 21 which, in turn, is carried in and rotated by a lathe indicated generally by the reference numeral 30. The lathe carriage 31 supports a cross slide 32 which, in turn, carries a tool mount 34 fitted with the tools 102. A displacement sensing assembly consisting of a light source 36 providing a light beam (not shown) tangential to the bottom of valley 26, and photoelectric cell 35 receiving a signal from light source 36 is supported by the tool mount 34. The output sensing element photoelectric cell 35 is fed to the proportioning controller 39 which provides operating power to cross slide positioner 40. Venturi tubes, designated generally by the reference numeral 50, are mounted on an air manifold 51 which is affixed to the carriage 31. The venturi tube 50 serves to pneumatically remove the strip or ribbon 22 severed from the roll 20 by the tools 102.

In FIGURE 4A there is schematically represented a sectional view of the control and feeding mechanism of the apparatus 30 of FIGURE 4, a photocell 35 is positioned opposite a light source 36, the light beam from light source 36 tangentially contacts the periphery of the roll 20 between the cutting points of the tool 102 (generally similar to the tool 10). A signal from the photocell 35 activates the pre-amplifier 39a which in turn controls the motor controller 39 which in turn controls the motor or cross slide positioner 40 turning the shaft 40a which is threaded and in engagement with the hub 32b of the cross slide 32. The pre-amplifier and motor controller are adjusted in such a manner to maintain the tool 102 in its desired cutting contact with the roll 20.

In FIGURE 5, there is illustrated a cross-sectional view of a pneumatic venturi tube indicated generally by the reference numeral 50 consisting of a generally cylindrical housing 51 provided with an air supply conduit 52. Within the housing are mounted deflector bushing 54 and throat piece 55. In operation, air under a pressure of about 2 to 10 pounds per square inch gauge enters the conduit 52 while a ribbon of film enters through deflector bushing 54 and both air and film are discharged through annular opening 55.

Tool feed rates in excess of one film thickness per revolution may be employed. For most purposes, however, one thickness per revolution is an advantageous rate for cutting the film on the roll, as it results in a generally cleaner cut. Such a monolayer cutting rate per revolution of the roll also permits easy and ready rewinding of the ribbon 22 which, in usual slitting operations, is ordinarily discarded as scrap.

The terms "monolayer" and "film thickness" as used herein refer to the layer of film as wound onto a roll. By way of further illustration, if one end of each of two separate films were attached to a mandrel and the mandrel rotated to wind the two films into a single double wound roll, the term "monolayer" would refer to a layer consisting of one thickness of each film.

The cutting tool employed in the present operation must be capable of providing a clean cut that does not fracture the film. It must also exhibit little friction while in engagement with the surface of the film. Otherwise, sufficient heat to melt or fuse the film being cut is generated. A side clearance angle on the cutting blade of ½ degree or greater is generally required to eliminate undesirable friction. Angles from about ½ degree up to about 30° may be employed with benefit. However, 30° is found to be an advantageous angle to use in spacing the inner divergent faces of the cutting blades or bits 12. Thus, in order to obtain an appreciable thickness of the blade 12, it is ordinarily desirable that the side clearance be less than about 30°. Binding or jamming may occur if the inner divergent angle between the cutting edges is greater than about 70°.

Fixed cutters which have a back rake angle of from about 5 to 88°, as illustrated in FIGURES 1 and 2, may be employed. A larger negative back rake angle is advantageously employed to obtain greater wear resistance and strength in the cutting edge.

While the apparatus and method of the invention may be operated manually, it is frequently advantageous to provide automatic control of tool position as illustrated in FIGURE 4. Conventional pneumatic electrical or electronic positioners may be employed. Pneumatic web controls are readily modified to control cross slide feed.

One advantageous method of tool feed control, illustrated in FIGURE 4, comprises employing a pinpoint light source 35 collimated to provide a light beam falling on a photoelectric cell 35, partially intercepting the light beam with the surface of the roll of film 20 in the valley 26; and adjusting the positioning equipment 39 and 40 to maintain the originally set light intensity detected by the photoelectric cell 35 by advancing the sensing assembly (35 and 36) supported on cross slide or tool support 34 as ribbon 22 is removed, thus maintaining an average feed rate for tools 102 of one film thickness per revolution of roll 20.

Employing a cutter, as illustrated in FIGURE 1, a 10 inch initial diameter roll of 1 mil thick polystyrene film was first mounted in an engine lathe rotating at about 1500 revolutions per minute, after which the roll was cut through to the supporting core in approximately 2.3 minutes. This was an average slitting rate of about 2400 feet per minute. The cutter actually employed had a shank width of about 0.6 inch and a shank depth of about 1½ inches; a shank length of about 7½ inches; about a 4° side clearance angle; about a 30° cutter angle; and about a 60° angle included between adjacent surfaces 12. The cut roll was then unwound and found to have unfractured, smooth, clean and sharp edges with no evidence of fusing. The ribbon removed from the roll appeared to have edges in condition equally as good as the parent roll. Thus, a cutting speed vastly in excess of that obtained by a conventional film slitter was achieved with excellent and entirely satisfactory results in the operation.

Similar excellent results have been obtained when cutters in accordance with the present invention have been employed with other fusible thermoplastic films, such as polyethylene, polypropylene and polyvinylchloride and polyvinylidene chloride polymers which have been cut in accordance with the invention.

Double wound film, such as is obtained when a tubular flat wound film is wound onto a roll, was easily cut by advancing a cutting tool into the roll at a rate of the thickness of the flattened tubular film per revolution of the roll. Similarly, rolls of film wound from a sheet or film having a plurality of layers may be advantageously cut by employing a tool feed rate of about one thickness of the multiple film per revolution of the roll.

As a matter of convenience, the foregoing description is directed to a cutting system wherein only the roll rotates. However, as is readily apparent, systems wherein the tool rotates about the roll or wherein both the tool and roll rotate, each having different angular velocities may be readily, and frequently with equal advantage, employed.

As is apparent, the apparatus is susceptible of being embodied with various alterations and modifications differing particularly from that which has been described in the preceding description and specification. For this reason, it is to be fully understood that all of the foregoing is merely intended to be illustrative and is not to be construed or interpreted as being restrictive or otherwise limiting of the present invention excepting as it is set forth and defined in the hereto appended claims.

What is claimed is:

1. A tool particularly adapted and suited for the cutting of rolls of wound thermoplastic resinous film, the tool comprising in cooperative combination two spaced cutting bits rigidly mounted on a shank, the bits having cutting edges, the cutting edges being defined by a first surface and a second surface, the first surfaces forming a side clearance angle of from about ½° to about 30° with a longitudinal feed axis of the shank, the second surfaces of the bits being symmetrically disposed on either side of the feed axis of the bit and forming an included angle of less than about 70° the cutting edges in angular relationship to the plane normal to the longitudinal axis of the shank, each of said bits terminating in a work engaging point remotely disposed from said shank, the second surfaces of the bits and the tool shank defining a substantially unobstructed space therebetween whereby the points of the bits may engage a solid planar surface simultaneously.

2. The tool of claim 1 wherein the cutting edge slopes from the point toward the shank.

No references cited.

WILLIAM W. DYER, Jr., *Primary Examiner.*